(12) United States Patent
Wollesen

(10) Patent No.: US 10,314,282 B2
(45) Date of Patent: Jun. 11, 2019

(54) STALL DIVIDER

(75) Inventor: Tommy Wollesen, Rødekro (DK)

(73) Assignee: Cow-Welfare A/S (DK)

( * ) Notice: Subject to any disclaimer, the term of this patent is extended or adjusted under 35 U.S.C. 154(b) by 0 days.

(21) Appl. No.: 13/428,844

(22) Filed: Mar. 23, 2012

(65) Prior Publication Data

US 2012/0234257 A1 Sep. 20, 2012

Related U.S. Application Data

(63) Continuation of application No. PCT/DK2009/000269, filed on Dec. 23, 2009.

(30) Foreign Application Priority Data

Sep. 25, 2009 (DK) .................................. 2009 01060

(51) Int. Cl.
*A01K 1/00* (2006.01)

(52) U.S. Cl.
CPC .......... *A01K 1/0011* (2013.01); *A01K 1/0005* (2013.01)

(58) Field of Classification Search
USPC ................. 119/516, 517, 519, 520, 522, 523
IPC ................................................ A01K 1/00,15/00
See application file for complete search history.

(56) References Cited

U.S. PATENT DOCUMENTS

| | | | |
|---|---|---|---|
| 1,086,812 A * | 2/1914 | Ferris .................. | A01K 1/0011 119/523 |
| 3,476,084 A * | 11/1969 | Nater et al. .................. | 119/401 |
| 3,744,456 A * | 7/1973 | Wheeler ............... | A01K 1/0236 119/513 |
| 4,350,117 A * | 9/1982 | Hacker ......................... | 119/523 |
| 4,715,322 A * | 12/1987 | Johansson ............ | A01K 1/0005 119/518 |
| 4,870,782 A * | 10/1989 | Purves .......................... | 49/364 |
| 5,423,289 A * | 6/1995 | Larsen et al. ................ | 119/520 |
| 5,558,043 A * | 9/1996 | Givens ......................... | 119/519 |
| 5,967,091 A * | 10/1999 | Zartman ...................... | 119/522 |
| 5,975,026 A | 11/1999 | Rudolph | |
| 6,026,766 A * | 2/2000 | Albers, Jr. .................... | 119/520 |
| 6,318,297 B1 * | 11/2001 | Hatfield ....................... | 119/516 |
| 6,467,434 B1 * | 10/2002 | Dejonge et al. .............. | 119/516 |

(Continued)

FOREIGN PATENT DOCUMENTS

| | | |
|---|---|---|
| CA | 2008514 C | 8/1993 |
| DE | 19547372 A1 | 7/1997 |

(Continued)

OTHER PUBLICATIONS

Translation of EP 1459623.*

(Continued)

*Primary Examiner* — Thanh Pham
(74) *Attorney, Agent, or Firm* — St. Onge Steward Johnston & Reens LLC

(57) ABSTRACT

A stall divider suitable for free stall stables including a vertical support member, a lower member extending away from the support member, an upper member extending away from the support member, and a crossing member extending perpendicularly to the upper member. The crossing member is made of a bendable or deflectable material and has a hollow or solid structure. The lower member, the upper member, and the crossing member include a soft or elastic outer layer. The construction of the stall divider increases the comfort and the welfare of the animals.

16 Claims, 2 Drawing Sheets

(56) References Cited

U.S. PATENT DOCUMENTS

| | | | |
|---|---|---|---|
| 2002/0011218 A1* | 1/2002 | Rudolph | A01K 1/0011 119/523 |
| 2005/0072371 A1 | 4/2005 | Moreau | |
| 2005/0161002 A1 | 7/2005 | Robinson | |
| 2005/0263092 A1* | 12/2005 | Moreau | 119/516 |
| 2007/0006817 A1* | 1/2007 | Komro | A01K 1/0011 119/523 |

FOREIGN PATENT DOCUMENTS

| | | | |
|---|---|---|---|
| DE | 202007008820 U1 | | 10/2007 |
| EP | 1459623 | * | 9/2004 |
| GB | 747401 A | | 4/1956 |
| GB | 2324700 A | | 11/1998 |
| RU | 76546 U1 | | 9/2008 |
| SU | 1308277 A1 | | 5/1987 |
| WO | 2009052829 A1 | | 4/2009 |

OTHER PUBLICATIONS

English Abstract of Russian Patent No. RU 2242119 (C2) Inventors: Kartashov, et al. Granted: Dec. 20, 2004 1 page (retrieved from Espacenet).

International Search Report; Application No. PCT/DK2009/000269; Issued: Aug. 11, 2010; dated Aug. 19, 200; 3 pages.

International Preliminary Report on Patentability & Written Opinion of the International Searching Authority; Application No. PCT/DK2009/000269; dated Mar. 27, 2012; 4 pages.

Gamroth M.J. et al; "Designing Dairy Free Stalls"; Pacific Northwest Cooperative Extension Bulletin, PNW, 321, Reprinted Jan. 1993.

Third Party Observations, Communication from the EPO, Jun. 10, 2015, 5 pages.

* cited by examiner

STALL DIVIDER

CROSS-REFERENCE TO RELATED APPLICATIONS

The present application is a continuation of pending International Patent Application PCT/DK2009/000269, filed on Dec. 23, 2009, which designates the United States and claims priority from Danish Patent Application PA 2009 01060, filed on Sep. 25, 2009, the content of which is incorporated herein by reference.

FIELD OF THE INVENTION

The invention relates a stall divider suitable for free stall stables comprising at least one vertical support member, at least one lower member extending away from the support member, at least one upper member extending away from the support member, and at least one crossing member extending perpendicularly to the upper member(s).

BACKGROUND OF THE INVENTION

Stall dividers today comprise a pivotal neck rail of metal, which can be pivoted up and down; however, this structure is more liable to fail if the cow applies a larger amount of force to it. Furthermore, the rigid structure may hurt the cow when the cow comes in contact with the neck rail. The neck rail also limits the movement when the animal is standing up. Such a stall divider is described in WO 2009/052829 A1.

U.S. 2007/0006817 A1 describes a free stall divider comprising a divider member, a support rail mounted on a structural member of the barn, and a control rail suspended from the support rail. The disadvantage is that the control rail is not sufficiently effective to prevent the cow from entering further into the stall. Furthermore, the cow may easily move into the adjacent stall or the opposite stall.

Conventional stall dividers, such as described in U.S. 2005/0263092 A1, consist mainly of metal, which reduces the comfort and welfare of the animals since the animals may hurt themselves on the rigid structural elements. Furthermore, the disadvantage with the conventional structures is that the animals may get stuck in the structure, thus reducing the comfort and welfare even more.

None of these stall dividers provides a simple and versatile structure that improves the comfort and welfare of the animals.

SUMMARY OF THE INVENTION

The object of the invention is to improve the comfort and welfare of free ranging cows by providing an improved stall divider having a more versatile and a simpler structure. The structure is also more cost-effective and easier to manufacture and to assemble.

The invention solves these problems by providing a stall divider suitable for free stall stables characterised in the crossing member being firmly mounted on the upper member. This enables the stall divider to be adjusted according to different size animals.

The crossing member is, in some embodiments, made of a bendable or deflectable material. The lower member is, in some embodiments, made of a bendable or deflectable material. The upper member is, in some embodiments, made of a bendable or deflectable material. The lower member and the upper member are, in some embodiments, made of a bendable or deflectable material. This enables the stall divider to bend or deflect to a certain degree when an animal applies pressure to the member, which in turn increases the comfort and welfare of the animals.

The crossing member and either the lower member or the upper member comprise a hollow tube structure, in some embodiments. The thickness of the crossing member is, in some embodiments, smaller than the thickness of the lower member or the upper member. This enables the stall divider to deflect or bend more when pressure is applied, thus increasing the comfort and welfare of the animals.

In some embodiments, at least one second lower member, at least one second upper member, and at least one second crossing member are mounted on the opposite side of the vertical support member.

The invention also solves these problems by providing a free stall stable comprising a plurality of stall dividers arranged in one or more rows and/or columns, in some embodiments.

The embodiments of the invention will now be described in detail with reference to the drawings.

DETAILED DESCRIPTION OF THE INVENTION

Figure 1:
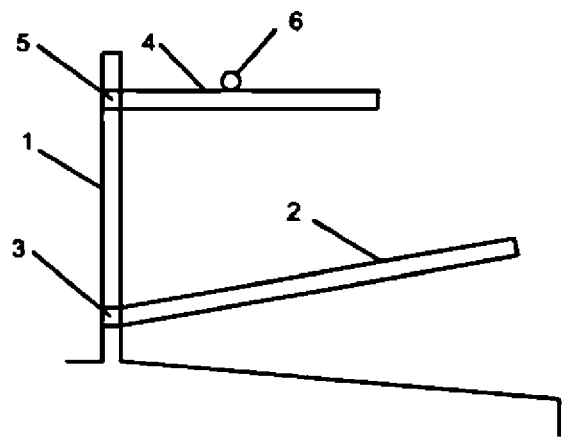
FIG. 1 shows one embodiment of the invention with a support member.

FIG. 1 shows an embodiment of the invention. The stall divider may comprise a vertical support member 1 extending down into the ground or the floor of the stable. The vertical support member 1 may alternatively be mounted on a support structure in the ground or floor. The support member 1 may be a hollow or a solid support bar made of a rigid material such as iron, steel, wood, or similar materials. The support bar may have any cross-sectional shape, preferably square or circular. The dimensions of the vertical support member 1 may depend on the intended use of the stall dividers.

A lower member 2 may be mounted on the vertical support member 1 near the ground or the floor. One end of the lower member 2 may be secured to the vertical support member 1 at a certain position using a mounting fixture 3. The mounting fixture 3 may have a construction that enables it to be moved up or down on the support member 1. The mounting fixture 3 may be attached to the lower member 2 and/or the vertical support member 1 using bolts, screws, or any other type of fastening means. In an alternative embodiment the mounting fixture 3 may comprise a first plate (not shown) connected to the lower member 2 and attached to a second plate (not shown) on the opposite side of the support member 1 via the fastening means. In a second alternative embodiment the mounting fixture 3 may comprise a first plate (not shown) connected to the lower member 2, and one or more U-shaped fastening means may be connected to the first plate. This enables the lower member to be adjusted according to different size animals.

Alternatively, the lower member 2 may be mounted directly on the support member 1 using any type of fastening means or by welding or any similar process.

An upper member 4 may be mounted on the vertical support member 1 at the opposite end. The upper member 4 is secured to the vertical support member 1 at a certain position using a mounting fixture 5. The mounting fixture 5 may have a construction that enables it to be moved up or down on the support member 1. The mounting fixture 5 may be attached to the upper member 4 and/or the vertical support member 1 using bolts, screws, or any other type of fastening means. In an alternative embodiment the mounting fixture 5 may comprise a first plate (not shown) connected to the upper member 4 and attached to a second plate (not shown) on the opposite side of the support member 1 via the fastening means. In a second alternative embodiment the mounting fixture 5 may comprise a first plate (not shown) connected to the upper member 2, and one or more U-shaped fastening means may be connected to the first plate. In a preferred embodiment the mounting fixtures 3, 5 may be identical. This enables the upper member to be adjusted according to different size animals.

Alternatively, the upper member 4 may be mounted directly on the support member 1 using any type of fastening means or by welding or any similar process.

In a preferred embodiment the lower member 2 extends further than the upper member 4. The lower member 2 and/or the upper member 4 may also be moved in the longitudinal direction according to the intended use of the stall dividers and the size of the animals.

The lower member 2 may extend away from the support member 1 at a predetermined angle α relative to the longitudinal direction of the support member. The upper member 4 may extend away from the support member 1 at a predetermined angle β relative to the longitudinal direction of the support member. The upper member 4 may be angled differently relative to the support member 1, or at the same angle as the lower member 2. This enables the lower and upper members to be placed at optimum angles relative to the size of the animals.

In a preferred embodiment, for increased comfort and welfare, the lower member 2 is positioned at an inclined angle, whereby the animal is guided into the resting position and is prevented from getting stuck while resting. The upper member 4 is positioned perpendicularly or essentially perpendicularly to the vertical support member 1, which will prevent the animal from entering the adjacent stalls.

The lower 2 and upper member 4 may be made of a material that enables them to bend or deflect to a certain degree when the animal applies pressure to the members. Such material may be plastic, fibreglass or similar resilient materials. Any other type of material having the same properties may be used. Alternatively, the lower 2 and upper member 4 may be made of different materials or comprise different properties. This enables the stall divider to increase the comfort and welfare of the animals.

The lower 2 and upper member 4 may be shaped like a hollow or a solid tube or rod having a circular, elliptic, square, or any other cross-sectional shape. The thickness or diameter of the tubes or rods in the lower member 2 and in the upper member 4 may differ or may be the same. This enables the stall divider to deflect or bend more when pressure is applied, thus increasing the comfort and welfare of the animals.

Optionally, the lower 2 and/or upper member 4 may also comprise an outer layer of a soft or elastic material, such as rubber, polymer, or similar materials, for added comfort.

In alternative embodiment the lower 2 and/or upper member 4 may be connected to a spring-like element mounted on the mounting fixture. This enables the lower 2 and/or upper member 4 to bend when pressure is applied to that particular member.

The bendable or deflectable material enables the other end of the lower member 2 and the upper member 4 to be moved in the horizontal and/or in the vertical direction when pressure is applied to the member. The other end will return to its starting position when the pressure on the member subsides. The other end of the lower member 2 and the upper member 4 may be closed and comprise rounded edges, so that the animal does not get hurt.

A crossing member 6 may be mounted on top or below the upper member 4 at a distance from the vertical support member 1 and perpendicularly to the upper member 4. The crossing member 6 may be secured to the upper member 4 using fastening elements (not shown). This enables the crossing member 6 to be positioned according to different size animals.

The fastening elements may be two or more U-shaped bracket elements held together using any type of fastening means. The bracket elements or fastening means may be made of plastic, metal, or similar materials, which will enable the bracket elements to break away when excessive pressure is applied to the crossing member 6. Alternatively, both the bracket elements and the fastenings means may be made of the same material.

The crossing member 6 may be made of a different bendable or deflectable material than the lower and upper members 2, 4 but having the same properties. In a preferred embodiment all three members are made of the same material. By using a flexible material, the animal does not get hurt when hitting the members 2, 4, 6, and the animal is able to rest comfortably against these members. This also reduces the noise level due to "banging" in the stable and results in less noisy animals, whereby comfort and welfare is increased.

The crossing member 6 may comprise the same hollow or solid structure and shape as the lower member 2 or the upper member 4. An outer layer of a soft or elastic material, such as rubber, polymer, or similar cushioning materials, may be applied to the crossing member 6 for added comfort.

Figure 2:
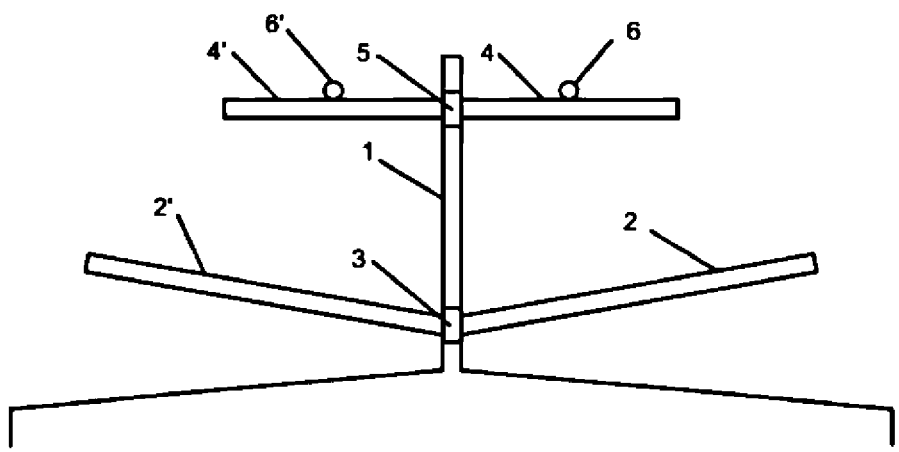
FIG. 2 shows a second embodiment of the invention with a support member.

FIG. 2 shows another embodiment of the invention. As shown in FIG. 1, the lower member 2 and the upper member 4 are positioned on the same side of the support member 1. An additional lower 2', upper 4', and crossing 6' member are positioned at the opposite side of the support member 1. The two lower members 2, 2' may be positioned opposite each other or at different positions. The additional lower member 2' may be attached to the mounting fixture 3 or to a third mounting fixture (not shown). Similarly, the two upper members 4, 4' may be positioned opposite each other or at different positions. The additional upper member 4' may be attached to the mounting fixture 5 or to a forth mounting fixture (not shown).

Figure 3:
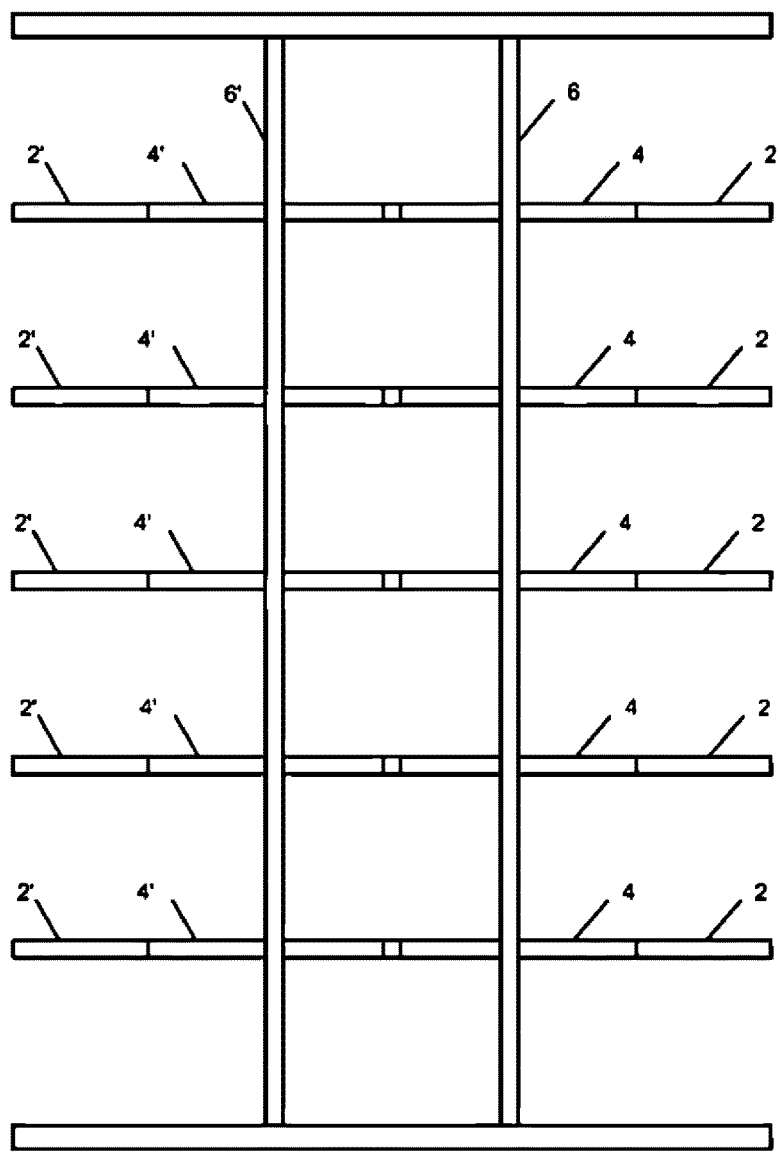
FIG. 3 shows a method of use.

In a method of use as shown in FIG. 3 a plurality of stall dividers may be mounted inside the stable in rows or in columns. The support members 1 may be spaced equally between the rows or columns. The heights of the lower members 2, 2' and the upper members 4, 4' may be adjusted by moving the mounting fixtures 3, 5, respectively, up or down on the vertical support member 1. The crossing members 6, 6' may be positioned on top or below the upper members 4, 4' extending throughout the entire length of the rows and/or columns. The crossing members 6, 6' may be secured to the upper members 4, 4' at any desired distance from the vertical support member 1.

A support member 1 may be positioned at each end of a row and/or column. Alternatively, a solid structure, such as a wall, may be positioned at each end of a row and/or column.

The lower member 2 guides the animals into their resting position, while the upper member 4 guides the animal in and out of the stall and prevents the animal from turning around in the stall. The upper member 4 also prevents the animal from entering an adjacent stall. The crossing member 6 marks the end of the stall for the animal when the animal enters the stall. If the animal wants to move through the stall, the construction of the crossing member 6 and the fastening elements enables the animal to move through the stall without getting hurt or injured.

A resting rail (not shown) may be mounted on the vertical support member 1 near the ground or floor, so that the animal may rest comfortably. Alternatively, a resting structure (not shown) may be positioned on the ground or floor near or between the vertical support members 1, so that the animal may rest comfortably.

The stall divider provides an easy and simple way of mounting the members 2, 4, 6 on the support member 1, thus making the structure more versatile. The upper 4 and crossing 6 members provide more space for the animal to move its head around, thereby increasing comfort and welfare of the animals.

The construction described in the preferred embodiment may be combined with any one of the described alternative embodiments. The stall divider is suitable for stables comprising cows, pigs, sheep, horses, goats, or other animals.

What is claimed is:

1. A stall divider suitable for free stall stables comprising at least one rigid vertical support member made of steel, at least one lower member having a first thickness and extending away from the support member in a first direction, said at least one lower member being made of bendable or deflectable material; at least one upper member secured to the support member and having a second thickness and extending away from the support member in said first direction, said at least one upper member being made of bendable or deflectable material; said upper and lower members being separate pieces, and at least one hollow, tubular crossing member having a third thickness and being made of resilient plastics or fibreglass and extending perpendicularly to the upper member, wherein the crossing member is mounted using fastening elements on top of and supported by the upper member and the at least one crossing member being bendable due to the resilient plastics or fibreglass of which the at least one crossing member is made.

2. The stall divider according to claim 1 wherein either the lower member or the upper member comprise a hollow tube structure.

3. The stall divider according to claim 2 wherein the third thickness of the crossing member is smaller than the first and second thickness of the lower member or the upper member.

4. The stall divider according to claim 1 wherein at least one second lower member, at least one second upper member, and at least one second crossing member are mounted on opposite sides of the vertical support member.

5. The stall divider according to claim 1, wherein one end of the lower member is secured to the vertical support member at a certain position using a mounting fixture of a construction that enables it to be moved up or down on the support member.

6. The stall divider according to claim 1, wherein the upper member is secured to the vertical support member at a certain position using a mounting fixture of a construction that enables it to be moved up or down on the support member.

7. The stall divider according to claim 5, wherein the lower member and/or the upper member is connected to a spring-like element mounted on the mounting fixture.

8. The stall divider according to claim 1, wherein the upper member is positioned perpendicularly or essentially perpendicularly to the vertical support member.

9. The stall divider according to claim 1, wherein the lower member and/or the upper member comprises an outer layer of a soft or elastic material.

10. The stall divider according to claim 1, wherein the crossing member comprises an outer layer of a soft or elastic material.

11. The stall divider according to claim 1, wherein the at least one vertical support member is made of a rigid material.

12. The stall divider according to claim 1 wherein the crossing member is bendable about an axis parallel to the upper member.

13. The stall divider of claim 1, wherein the upper member is removable from the vertical member.

14. The stall divider of claim 1, wherein the lower member is removable from the vertical member.

15. A free stall stable comprising a plurality of stall dividers arranged in one or more rows and/or columns, wherein each of the stall dividers comprises at least one rigid vertical support member made of steel, at least one lower member having a first thickness and extending away from the support member in a first direction, said at least one lower member being made of bendable or deflectable material; at least one upper member secured to the support member and having a second thickness and extending away from the support member in said first direction, said at least one upper member being made of bendable or deflectable material; said upper and lower members being separate pieces, and at least one hollow, tubular crossing member having a third thickness and being made of resilient plastics or fibreglass and extending perpendicularly to the upper member, wherein the crossing member is mounted using fastening elements on top of and supported by the upper member and the at least one crossing member being bendable due to the resilient plastics or fibreglass of which the at least one crossing member is made.

16. The free stall assembly of claim 15, wherein at least one of the upper and lower members is removable from the vertical support member.

* * * * *